(12) United States Patent
Li (10) Patent No.: US 10,177,800 B2
(45) Date of Patent: Jan. 8, 2019

(54) MOBILE POWER BANK AND COMBINED TERMINAL DEVICE

(71) Applicants: ZHEJIANG GEELY HOLDING GROUP CO., LTD, Hangzhou (CN); ZHEJIANG GEELY AUTOMOBILE RESEARCH INSTITUTE CO., LTD, Taizhou (CN)

(72) Inventor: Shufu Li, Hangzhou (CN)

(73) Assignees: ZHEJIANG GEELY HOLDING GROUP CO., LTD, Hangzhou (CN); ZHEJIANG GEELY AUTOMOBILE RESEARCH INSTITUTE CO., LTD, Taizhou (CN)

( * ) Notice: Subject to any disclaimer, the term of this patent is extended or adjusted under 35 U.S.C. 154(b) by 0 days.

(21) Appl. No.: 15/568,235

(22) PCT Filed: Apr. 19, 2016

(86) PCT No.: PCT/CN2016/079622
§ 371 (c)(1),
(2) Date: Oct. 20, 2017

(87) PCT Pub. No.: WO2016/169460
PCT Pub. Date: Oct. 27, 2016

(65) Prior Publication Data
US 2018/0115337 A1    Apr. 26, 2018

(30) Foreign Application Priority Data
Apr. 21, 2015 (CN) .......................... 2015 1 0190921

(51) Int. Cl.
*H04B 1/3883* (2015.01)
*H02J 7/00* (2006.01)
(Continued)

(52) U.S. Cl.
CPC ........ *H04B 1/3883* (2013.01); *H01M 2/1022* (2013.01); *H01M 2/204* (2013.01);
(Continued)

(58) Field of Classification Search
CPC .......................... H04W 52/0229; H04W 4/60
See application file for complete search history.

(56) References Cited

U.S. PATENT DOCUMENTS

| 8,547,061 | B1 | 10/2013 | Wong |
| 2004/0023698 | A1* | 2/2004 | Chang ................. H02J 7/0044 455/573 |

(Continued)

FOREIGN PATENT DOCUMENTS

| CN | 202721461 U | 2/2013 |
| CN | 103209232 A | 7/2013 |

(Continued)

OTHER PUBLICATIONS

International Search Report and Written Opinion for corresponding International Application No. PCT/CN2016/079622, dated Jul. 8, 2016, 12 pages.

(Continued)

*Primary Examiner* — Lewis West
(74) *Attorney, Agent, or Firm* — Alston & Bird LLP (57) ABSTRACT

The present invention relates to a mobile terminal, and in particular to a mobile power bank and a combined terminal device formed by splicing the mobile power bank and the mobile terminal. The mobile power bank comprises a display screen, a storage battery located below the display screen, and a casing for holding the display screen and the storage battery. The mobile power bank is generally flat-plate shaped with a front surface and a back surface. Both an area of a display region of the display screen and an area of an occupied region of the storage battery are not less than (Continued)

70% of the front surface area. A volume of the storage battery can be increased without changing the thickness of the storage battery, providing an extended charging service for mobile phones. In addition, the mobile power bank of the present invention has a large display screen, when the mobile power bank is connected to a mobile terminal, such as a mobile phone, the display screen and a display screen of the mobile terminal may perform display at the same time.

15 Claims, 9 Drawing Sheets

(51) Int. Cl.
*H01M 2/20* (2006.01)
*H01M 2/30* (2006.01)
*H01M 10/42* (2006.01)
*H01M 2/10* (2006.01)
*H04M 1/02* (2006.01)
*H04M 1/725* (2006.01)

(52) U.S. Cl.
CPC ............ *H01M 2/30* (2013.01); *H01M 10/425* (2013.01); *H02J 7/00* (2013.01); *H02J 7/0044* (2013.01); *H02J 7/0068* (2013.01); *H04M 1/0256* (2013.01); *H04M 1/72519* (2013.01); *H04M 1/72527* (2013.01); *H01M 2010/4278* (2013.01); *H01M 2220/30* (2013.01); *H04M 1/0254* (2013.01); *H04M 2201/08* (2013.01); *H04M 2250/16* (2013.01)

(56) References Cited

U.S. PATENT DOCUMENTS

| | | | |
|---|---|---|---|
| 2004/0077388 A1* | 4/2004 | Crum | G06K 19/07758 455/575.3 |
| 2013/0298039 A1* | 11/2013 | Mestre | G06F 3/0484 715/753 |
| 2014/0141838 A1 | 5/2014 | Sen et al. | |
| 2015/0263777 A1* | 9/2015 | Fraden | H04B 1/3888 455/575.8 |
| 2015/0380139 A1* | 12/2015 | Hsu | H04M 1/04 335/285 |
| 2018/0096876 A1* | 4/2018 | Su | H01L 21/6835 |

FOREIGN PATENT DOCUMENTS

| | | |
|---|---|---|
| CN | 103338281 A | 10/2013 |
| CN | 203398838 U | 1/2014 |
| CN | 203504242 U | 3/2014 |
| CN | 104051907 A | 9/2014 |
| CN | 203840380 U | 9/2014 |
| CN | 203859566 U | 10/2014 |
| CN | 203932505 U | 11/2014 |
| CN | 104853017 | 8/2015 |
| EP | 1715550 A1 | 10/2006 |
| EP | 2674831 A2 | 12/2013 |
| EP | 2720446 A2 | 4/2014 |

OTHER PUBLICATIONS

EP Search Report for corresponding European Application No. 16782607, dated May 7, 2016, 2 pages.

* cited by examiner

MOBILE POWER BANK AND COMBINED TERMINAL DEVICE

FIELD OF THE INVENTION

The present invention relates to a mobile terminal, and in particular to a mobile power bank and a combined terminal device formed by splicing the mobile power bank and the mobile terminal.

BACKGROUND OF THE INVENTION

In the prior art, a length-width ratio of a mobile phone display screen is generally locked as 16:9 or 16:10. In order to realize a single-hand touch operation on a display screen as far as possible, the area of the display screen at this time is generally small, for example the display screen of 3.5 inch, which is far from satisfying the requirements of people for a large display area. However, when the display area of the display screen is set to be large enough, for example the display screen of 5.5 inch, at this time, due to being limited by the foregoing length-width ratio, the width of the display screen is too large, causing a single-hand operation not to be performed generally.

Moreover, with regard to a display screen designed according to the foregoing length-width ratio, when it displays publication documents most of which are in a A4 paper size, a black border is generally left at the periphery of the display screen, which not only affects the display effect, but also does not realize the maximum utilization of the display screen.

Furthermore, since mobile phones are renewed very rapidly, mobile phone users change mobile phones also at faster frequencies. Discarding old mobile phones could cause serious resource waste and environmental pollution. There are no good solutions yet in the present market. A method of recycling mobile phones is generally adopted, in such a way that the reproduction cost of waste mobile phones will become higher, but also a secondary pollution during recycling and reproduction can be caused.

In addition, power consumption has increased due to bigger bigger screens of mobile phones; on the other hand, the thickness of mobile phones tends to become thinner, which results in that the battery of the mobile phones cannot be made too large. Therefore, the low power problem commonly exists in mobile phones now.

SUMMARY OF THE INVENTION

The inventor of the present application is accidentally aware, before recognizing the forgoing prior art, that the above-mentioned several problems, that seem unrelated to each other, existing in the prior art can be solved uniformly by designing a mobile terminal with a particular structure.

According to one aspect of the present invention, a mobile terminal is provided, for splicing a plurality of said mobile terminals into a combined terminal device, said mobile terminal comprising:

a display screen;

a first side surface and a second side surface located at two opposing sides of the display screen, wherein said first and second side surfaces are planes parallel to each other; and a first magnetic adsorbing element provided at said first side surface and a second magnetic adsorbing element provided at said second side surface, wherein said first and second magnetic adsorbing element are positionally disposed such that: when the other one of said mobile terminals and a current one of said mobile terminals are spliced, said first magnetic adsorbing element at said first side surface of said mobile power bank and said second magnetic adsorbing element at said second side surface of the other one of said mobile terminals can attract each other, so that said first side surface of said mobile power bank and said second side surface of the other one of said mobile terminals are bonded in alignment with each other.

Preferably, said first magnetic adsorbing element does not protrude out of said first side surface, and said second magnetic adsorbing element does not protrude out of said second side surface.

Preferably, said mobile terminal further comprises:

a first conductive contact arranged at said first side surface, and a second conductive contact arranged at said second side surface;

said first and second conductive contact are positionally disposed such that: when said first side surface of said mobile power bank and said second side surface of the other one of said mobile terminals are bonded in alignment with each other, said first conductive contact at said first side surface of said mobile power bank and said second conductive contact at said second side surface of the other one of said mobile terminals can make electrical contact with each other.

Preferably, at least one of said first conductive contact and said second conductive contact is made of an elastic material or biased by a spring so as to be able to move in a direction perpendicular to the side surface where it is located.

Preferably, said first conductive contact is composed of a plurality of bow-shaped metal sheets, and said second conductive contact is recessed into said second side surface; and said first conductive contact of the current one of said mobile terminals and said second conductive contact of the other one of said mobile terminals abut each other, so that said second side surface of the other one of said mobile terminals and said first side surface of said mobile power bank are bonded in alignment with each other by deforming said first conductive contact in the direction perpendicular to the side surface where it is located.

Preferably, said first side surface has a first groove, and the first conductive contact is rotatably connected into the first groove; and said first conductive contact can rotate out of said first groove so as to make contact with said second conductive contact of the other one of said mobile terminals, and said first conductive contact can rotate inwardly to said first groove so as to disconnect the contact with said second conductive contact of the other one of said mobile terminals.

Preferably, at least one of said first conductive contact and said second conductive contact is formed as an active contact which can move between an extended position and a retracted position, wherein the active contact protrudes out of the side surface where it is located when in the extended position.

Preferably, the side surface where said active contact is located is provided with a recessed portion for accommodating said active contact.

Preferably, said mobile terminal further comprises:

a detachable contact cover for sealing said recessed portion;

wherein when said contact cover seals said recessed portion, said contact cover is flush with a side surface where it is located.

Preferably, said mobile terminal further comprises:

a manual operation key arranged at said first side surface and/or second side surface, wherein said manual operation key is formed within a second groove of a side surface where it is located, so that the profile of said manual operation key is not beyond of the side surface where it is located.

Preferably, said mobile terminal is a rectangle without rounded corners as a whole.

Preferably, a left magnetic adsorbing element and a right magnetic adsorbing element disposed along a width direction of the display screen are arranged at a back side of said mobile terminal, and the left and right magnetic adsorbing element are positionally disposed such that: when the other one of said mobile terminals abuts a current one of said mobile terminals back to back, said left magnetic adsorbing element and said right magnetic adsorbing element of said mobile power bank and said left magnetic adsorbing element and said right magnetic adsorbing element of the other one of said mobile terminals can attract each other, so that a back face of said mobile power bank and a back face of the other one of said mobile terminals are bonded in alignment with each other.

Preferably, said display screen is substantially rectangular and is set to $L:W \leq 2.5$, where L is the length of said display screen, and W is the width of said display screen.

Preferably, $L:W=(205-215):[(290-304)/n]$, where n is a positive integer and $n \leq 4$.

Preferably, $n \geq 6$.

Preferably, n is 4 or 5.

Preferably, 150 mm$\leq$W$\leq$30 mm. Optionally, 90 mm$\leq$W$\leq$50 mm.

Preferably, L is 205-215 mm.

Preferably, W is 58-61 mm. Optionally, W is 60 mm, and L is 210 mm.

Preferably, W is 72-76 mm. Optionally, W is 74 mm, and L is 210 mm.

Preferably, said display screen is substantially rectangular and is set to $L:W=(205-215):[(290\sim304)/n]$, where L is the length of said display screen, W is the width of said display screen, and n is a positive integer and $n \leq 2$.

Preferably, n is 2 or 3.

Preferably, L is 205-215 mm.

Preferably, in the width direction of said display screen, two sides of said mobile terminal arranged opposite to each other are arranged in a frameless or a narrow frame form, wherein the width of said narrow frame is less than 1 mm.

Preferably, in the length direction of said display screen, at least one of the two sides of said mobile terminal arranged opposite to each other are arranged in the frameless or narrow frame form.

According to another aspect of the present invention, a combined terminal device is provided, which is formed by splicing N identical mobile terminals in the width direction and/or the length direction of said display screen, and enabling said display screens of said N mobile terminals to be formed into a single rectangular screen as a whole.

Preferably, the value of N is the same as n.

The present invention further provides another mobile terminal, wherein a display screen of said mobile terminal is substantially rectangular, and at least one of the length or width thereof is 205-215 mm.

The present invention further provides another combined terminal device, which is formed by splicing a plurality of mobile terminals in a single row, wherein a plurality of display screens corresponding to said plurality of mobile terminals are substantially rectangular and have the length or width of the same size, so that said plurality of mobile terminals are formed into a single rectangular screen as a whole after being spliced along said length or width of the same size; said length or width of the same size is 205-215 mm and serves as the width of said single rectangular screen; and the length of said single rectangular screen is 290-304 mm.

According to another aspect of the present invention, provided is a mobile power bank with a display screen, comprising:

a display screen;

a storage battery located below said display screen; and a casing for holding said display screen and said storage battery;

wherein said mobile power bank is generally flat-plate shaped with a front surface and a back surface; said display screen is located on said front surface and provides at least a part of said front surface; and both an area of a display region of said display screen and an area of an occupied region of said storage battery are not less than 70% of the area of said front surface.

Preferably, said mobile power bank is generally substantially rectangular flat-plate shaped.

Preferably, the area of the display region of said display screen is not less than 75%, 80%, 85%, 90% or 95% of the area of the front surface.

Preferably, the area of the occupied region of said storage battery is not less than 75%, 80%, 85%, 90% or 95% of the area of the front surface.

Preferably, said mobile power bank has the functions of receiving external power to charge said storage battery, supplying power for said display screen and an external device, and receiving display data from said external device for displaying on the display screen.

Preferably, said external device is a mobile terminal.

Preferably, said casing has a holding structure for holding the mobile terminal at said back surface.

Preferably, said holding structure has snap for clamping said mobile terminal.

Preferably, said holding structure comprises a rear magnetic adsorbing element arranged adjacent to said back surface, for adsorbing a corresponding rear magnetic adsorbing element arranged on said mobile terminal, so as to hold said mobile terminal at said back surface.

Preferably, the mobile power bank further comprises:

a first side surface and a second side surface located at two sides of said mobile power bank, wherein said first and second side surfaces are planes parallel to each other; and a first magnetic adsorbing element provided at said first side surface and a second magnetic adsorbing element provided at said second side surface, for adsorbing a corresponding side magnetic adsorbing element arranged at a side surface of a mobile terminal, so that any side of said mobile power bank can hold said mobile terminal by adsorption.

Preferably, said first magnetic adsorbing element does not protrude out of said first side surface, and said second magnetic adsorbing element does not protrude out of said second side surface.

Preferably, the mobile power bank further comprises:

a first conductive contact provided at said first side surface and a second conductive contact provided at said second side surface, for mutually electrically contacting with a conductive contact correspondingly provided at the side surface of said mobile terminal held by said mobile power bank, so as to provide data transmission from said mobile terminal to said mobile power bank and discharge from said mobile power bank to said mobile terminal.

Preferably, at least one of said first conductive contact and said second conductive contact is made of an elastic material or biased by a spring so as to be able to move in a direction perpendicular to the side surface where it is located.

Preferably, said first conductive contact is composed of a plurality of bow-shaped metal sheets, and said second conductive contact is recessed into said second side surface; and when said first conductive contact and said second conductive contact are in mutual electrical contact with a conductive contact correspondingly provided at the side surface of said mobile terminal held by said mobile power bank, said second side surface of said mobile terminals and said first side surface of said mobile terminals are bonded in alignment with each other by deforming said first conductive contact in the direction perpendicular to the side surface where it is located.

Preferably, said first side surface has a first groove, and the first conductive contact is rotatably connected into the first groove; and said first conductive contact can rotate out of said first groove so as to make mutual electrical contact with a conductive contact correspondingly provided at the side surface of said mobile terminal, and said first conductive contact can rotate inwardly to said first groove so as to disconnect the electrical contact with the conductive contact correspondingly provided at the side surface of said mobile terminal.

Preferably, at least one of said first conductive contact and said second conductive contact is formed as an active contact which can move between an extended position and a retracted position, wherein the active contact protrudes out of the side surface where it is located when in the extended position.

Preferably, the side surface where said active contact is located is provided with:

a recessed portion for accommodating said active contact, and a detachable contact cover for sealing said recessed portion.

The present invention further provides a combined terminal device composed by splicing one or more mobile terminals and at least one mobile power bank as claimed in any one of the above-mentioned technical solutions in the width direction and/or length direction of said display screen of said mobile power bank, wherein said mobile terminal provides display data of a display screen of the mobile terminal to said mobile power bank, and said storage battery of said mobile power bank supplies power for said mobile terminal.

Preferably, in the splicing direction, said display screen of said mobile power bank has the same width or length as the display screen of said mobile terminal.

Firstly, according to the above-mentioned technical solution, the mobile terminals involved in the present invention can be mutually spliced to form a combined terminal device, such that a display screen of the mobile terminal can be set to a width suitable for a single hand operation, and thus the requirements of people for a large display area are satisfied by forming the combined terminal device by means of splicing. Moreover, since the mobile terminals can be spliced, the display screen of the combined terminal device formed by splicing can be in a A4 paper ratio by setting a suitable mobile terminal size and the number for splicing, and the display screen of such a combined terminal device can eliminate the black boarder when displaying the publication documents. In addition, when old mobile terminals meeting the technical solutions of the present invention are spliced to form a combined terminal device, a problem of a secondary pollution generated during recycling and reproduction of old mobile terminals can be further solved.

Next, according to the technical solutions of the present invention, two opposing sides, for example left and right sides or/upper and lower sides, of a display screen of the mobile terminal involved in the present invention are provided with a first magnetic adsorbing element and a second magnetic adsorbing element which can attract each other, such that a first magnetic adsorbing element/a second magnetic adsorbing element of one mobile terminal and second magnetic adsorbing elements/first magnetic adsorbing elements of other mobile terminals can attract each other, thereby forming a state of mutual splicing among mobile terminals. Due to the first magnetic adsorbing element and the second magnetic adsorbing element, it is not necessary to provide a special slot for splicing on the mobile terminal, so that the hand feeling of using the mobile terminal can be maintained. Moreover, a first side surface and a second side surface of the display screen are parallel to each other, so that one mobile terminal can be bonded to other mobile terminals on side faces, and the screen of a combined terminal device composed of a plurality of mobile terminals is on the same horizontal plane, thereby improving the display effect and the view feeling.

Furthermore, when the mobile terminal involved in the present invention is provided with left and right magnetic adsorbing elements at one side close to a back face, back faces of different mobile terminals can be mutually attracted together. That is to say, different mobile terminals can be spliced into a combined terminal device in a direction where a display screen is located, while when the combined terminal device is disassembled into a plurality of mobile terminals, the mobile terminals can be attracted together in pair via the left and right magnetic adsorbing elements, which not only facilitates carrying the mobile terminal, but also reduces the risk of losing the mobile terminal. A rear side refers to a back face of a mobile terminal, or a side arranged inside the mobile terminal and close to the back face of the mobile terminal.

Moreover, it can be understood according to the description above of the technical solutions of the present invention that in one technical solution of the present invention, as compared to a display screen with a display ratio of 16:9 or 16:10 (namely, a length-width ratio of 1.78 or 1.6) in the prior art, a length-width ratio of a display screen is set to at least 2.5 in the present invention. Therefore, the display screen of the present invention is more elongated in shape. Thus, with the same width, the display screen of the present invention has a larger display area. Or in other words, with the same display area, the display screen of the present invention can have a relatively small width, thereby facilitating a single hand operation of people.

In addition, after the display screen is significantly elongated as compared to the prior art, it can be surprisingly discovered that it is easier to realize a corresponding A4 paper ratio in a manner of splicing a plurality of display screens in a single row while such a display screen facilitates a single hand operation of a mobile phone user, although the present invention is not limited to single-row splicing. In addition, it can be envisaged that when a certain user reserves, due to the renewal of mobile phones, a plurality of mobile phones with this display screen, he/she can perform forgoing splicing on these mobile phones so as to form a combined terminal device.

It can be understood that when a mobile phone having the display screen in accordance with the present invention is evicted by a user, it may be generally due to other reasons independent of the display screen, such as shortage of a CPU or a storage space. However, such a display screen with a particular length-width ratio proposed in the present invention exactly provides corresponding utilization value for evicted old mobile phones, and this is because when a plurality of mobile phones including the old mobile phones are spliced into a combined terminal device, what is mainly used thereby is a display function of a display screen of the old mobile phone, while other capabilities of the combined terminal device can be provided by a new mobile phone with a better performance in the combined terminal device.

In particular, a main function of a display screen is providing a document for reading to a user, and when a display screen of a combined terminal device is substantially at an A4 paper ratio by splicing a suitable number of mobile terminals, a black boarder problem occurred during displaying a publication document taking the A4 ratio as a carrier can be eliminated substantially. This facilitates the reading of a document with an A4 ratio by a user on a spliced display screen, which more significantly improves the utilization value of the old mobile phones.

Since the mobile power bank provided according to the present invention is generally flat-plate shaped, and an area of an occupied region of the storage battery are not less than 70% of the front surface area, a volume of the storage battery can be increased without changing the thickness of the storage battery, providing an extended charging service for mobile phones; and since an area of a display region of the display screen is not less than 70% of the area of the front surface, and the mobile power bank of the present invention has a large display screen, when the mobile power bank is connected to a mobile terminal, such as a mobile phone, the display screen and a display screen of the mobile terminal may perform display at the same time. When a display screen of the mobile power bank is set to a width suitable for a single hand operation, and thus the requirements of people for a large display area are satisfied by forming the combined terminal device by means of splicing with a mobile terminal. Moreover, since the mobile power bank can be spliced, the display screen of the combined terminal device formed by splicing can be in a A4 paper ratio by setting a suitable number and size of mobile terminals, and the display screen of such a combined terminal device can eliminate the black boarder when displaying the publication documents. In one embodiment of the present invention, when the mobile power bank and the mobile terminal are spiced, on one hand, charging is supplied for the mobile terminal, and one the other hand, the display screen of the mobile power bank and the display screen of the mobile terminal form an A4 paper ratio together to display contents.

According to the detailed description of the particular embodiments of the present invention below in conjunction with the accompanying drawings, the above-mentioned and other objects, advantages and features of the present invention will be more clear to a person skilled in the art.

BRIEF DESCRIPTION OF THE DRAWINGS

Some of the particular embodiments of the present invention will be described below in detail in an exemplary but not limiting way with reference to the accompanying drawings. The same reference signs in the figures indicate the same or similar components or parts. A person skilled in the art should understand that these figures are not necessarily drawn to scale. In the accompanying drawings.

DETAILED DESCRIPTION OF THE INVENTION

Figure 1:
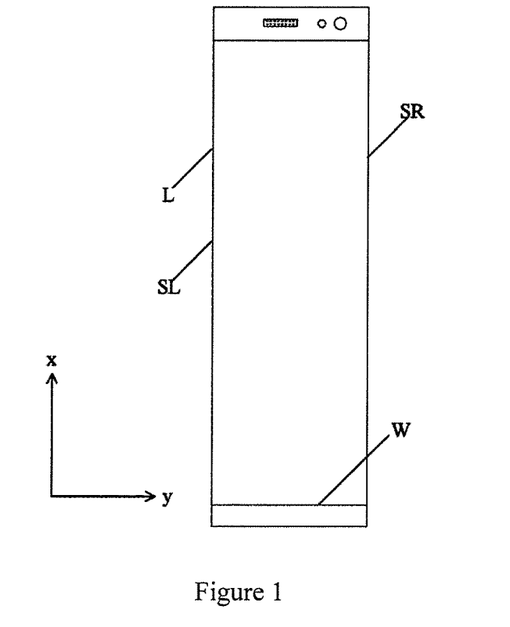
FIG. 1 is a structural schematic diagram of a mobile terminal according to one embodiment of the present invention.
Figure 2:
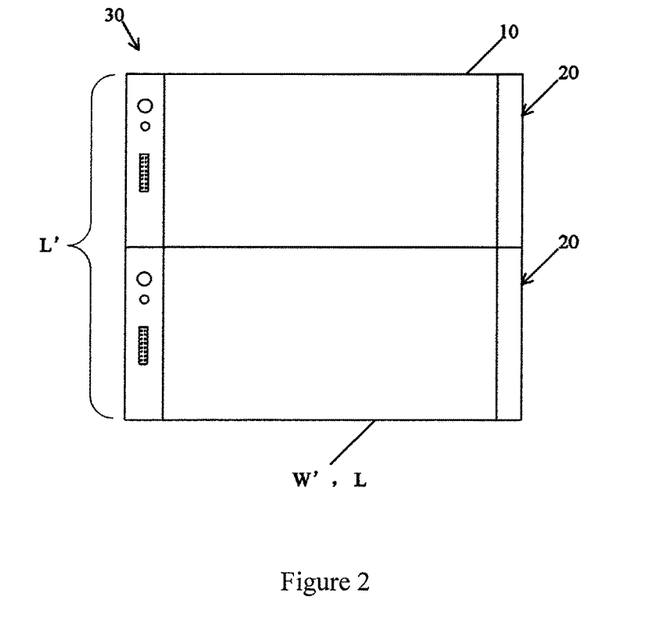
FIG. 2 is a schematic diagram of a combined terminal device according to one embodiment of the present invention, wherein the number of mobile terminals is two.
Figure 3:
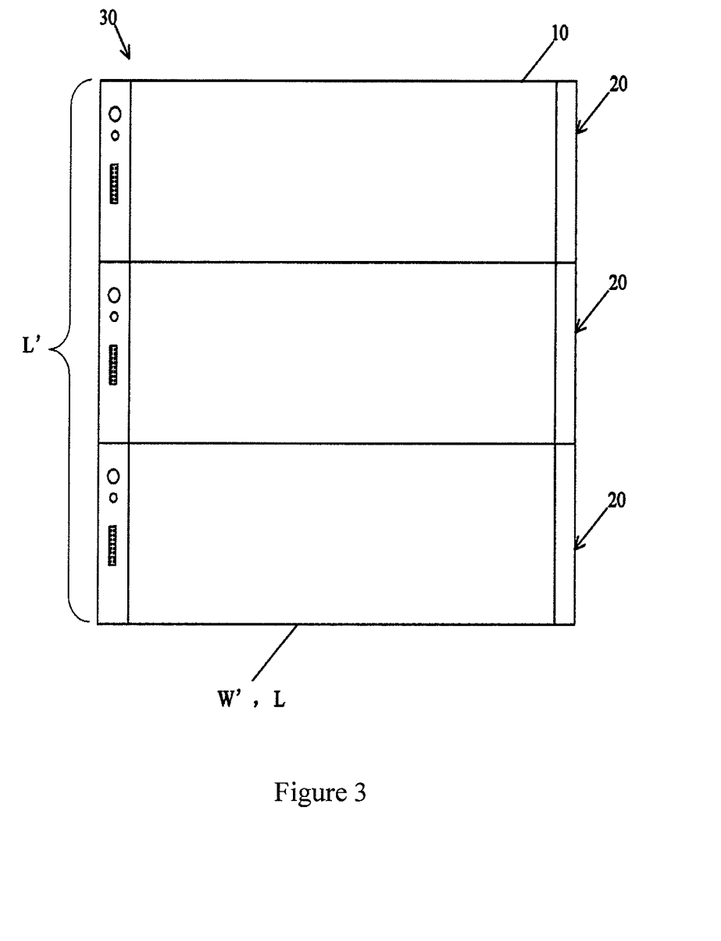
FIG. 3 is a schematic diagram of a combined terminal device according to one embodiment of the present invention, wherein the number of mobile terminals is three.

As shown in FIG. 1, the present invention provides a mobile terminal 20. The mobile terminal 20 differs from the prior art in that the mobile terminal is used for a combined terminal device 30, shown in one of FIGS. 2-5, which is formed by splicing a plurality of mobile terminals 20. In order to facilitate splicing, as shown in FIG. 1, the mobile terminal 20 is a rectangle without rounded corners as a whole. The mobile terminals 20 composing the combined terminal device 30 can be the same and can also be different, but the mobile terminals 20 should all comprise: a display screen 10; and a first side surface SL and a second side surface SR located at two opposing sides of the display screen 10, wherein the first and second side surfaces SL, SR are planes parallel to each other, In FIG. 1, the first side surface SL and the second side surface SR are respectively a left side face and a right side face, in other embodiments, the first side surface SL and the second side surface SR can also be an upper side face and a lower side face, and in another embodiment, the first side surface SL and the second side surface SR can also be a left side face and a right side face as well as an upper side face and a lower side face.

A first magnetic adsorbing element (not shown in figures) arranged at the first side surface SL and a second magnetic adsorbing element (not shown in figures) arranged at the second side surface. The first and second adsorbing elements can be iron, cobalt, nickel and a magnetic material capable of attracting the iron, the cobalt and the nickel. The first and second magnetic adsorbing elements are positionally disposed such that: when the other mobile terminal and a current mobile terminal are spliced, the first magnetic adsorbing element at the first side surface SL of the mobile terminal and the second magnetic adsorbing element at the second side surface of the other mobile terminal can attract each other, so that the first side surface of the current mobile terminal and the second side surface of the other mobile terminal are bonded in alignment with each other. According to the technical solution, a first magnetic adsorbing element/a second magnetic adsorbing element of one mobile terminal and second magnetic adsorbing elements/first magnetic adsorbing elements of other mobile terminals can attract each other, thereby forming a state of mutual splicing among mobile terminals. Due to the first magnetic adsorbing element and the second magnetic adsorbing element, it is not necessary to provide a special slot for splicing on the mobile terminal 20, so that the hand feeling of using the mobile terminal can be maintained. Moreover, a first side surface SL and a second side surface SR of the display screen 10/the mobile terminal 20 are parallel to each other, so that one mobile terminal can be bonded to other mobile terminals on side surfaces, and the screen of a combined terminal device 30 composed of a plurality of mobile terminals 20 is on the same horizontal plane, thereby improving the display effect and the view feeling.

In one embodiment of the present invention, the first magnetic adsorbing element does not protrude out of the first side surface SL, and the second magnetic adsorbing element does not protrude out of the second side surface SR. Two cases are included: in one case, the first magnetic adsorbing element belongs to a part of the first side surface SL (or the first magnetic adsorbing element is flush with the first side surface SL), the second magnetic adsorbing element belongs to a part of the second side surface SR (or the second magnetic adsorbing element is flush with the second side surface SR), and during splicing, first side surfaces SLs and second side surfaces SRs of different mobile terminals are in direct contact and attract each other; and in the other case, the first magnetic adsorbing element is arranged below the first side surface SL, the second magnetic adsorbing element is arranged below the second side surface SR, the first magnetic adsorbing element and the second magnetic adsorbing element attract each other, and the first side surface SL and the second side surface SR are in mutual contact while the first magnetic adsorbing element is not in mutual contact with the second magnetic adsorbing element.

In one embodiment of the present invention, the mobile terminal 20 further comprises a first conductive contact arranged at the first side surface and a second conductive contact arranged at the second side surface. The first and second conductive contact are positionally disposed such that: when a first side surface of a current mobile terminal 20 and a second side surface of the other mobile terminal 20 are bonded in alignment with each other, the first conductive contact at the first side surface of the mobile terminal 20 and the second conductive contact at the second side surface of the other mobile terminal 20 can make electrical contact with each other, so that charging and discharging operations and a data transmission operation can be performed between different mobile terminals via the first conductive contact and the second conductive contact. With regard to a single mobile terminal 20, a base matching the first conductive contact or the second conductive contact can be arranged, wherein the base is in contact with the first conductive contact or the second conductive contact for charging or data transmission. It should be specially noted that when a plurality of mobile terminals 20 form a combined terminal device 30, spliced positions between various mobile terminals 20 attract each other due to the first magnetic adsorbing element and the second magnetic adsorbing element, and at this time, first and second conductive contacts between different mobile terminals 20 can be closely bonded together, thereby guaranteeing the stability of charging and data transmission.

It can be seen from as stated above that since the first conductive contact and the second conductive contact are in direct contact, if hard-connected, a damage may be produced to the first conductive contact and the second conductive contact. Therefore, in the present invention, at least one of the first conductive contact and the second conductive contact is designed to be made of an elastic material or biased by a spring so as to be able to produce a certain amount of movement moving in a direction perpendicular to the side surface where it is located. Since there is a certain amount of movement, a damage to the first conductive contact and the second conductive contact can also be prevented while ensuring that the first conductive contact is in contact with the second conductive contact.

Figure 6:
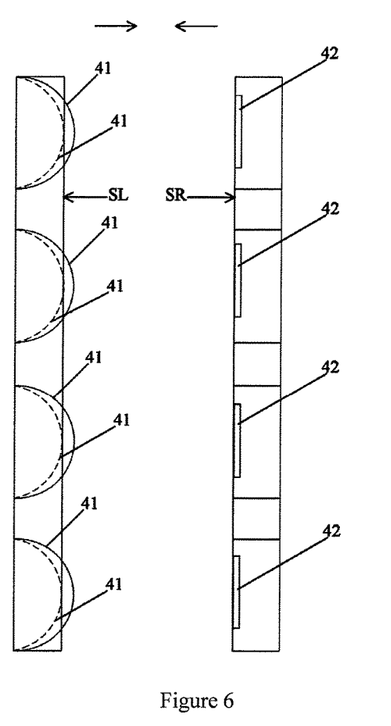
FIG. 6 is a schematic diagram of a first conductive contact and a second conductive contact in one embodiment of the present invention.

As shown in FIG. 6, the present invention further provides a design scheme for a first conductive contact and a second conductive contact: in FIG. 6, the first conductive contact 41 is composed of a plurality of bow-shaped metal sheets. A second conductive contact 42 is a very thin metal sheet, and an outer edge thereof can be in flush with a second side surface SR, but is recessed inside the second side surface SR as a whole. As shown in FIG. 6, when a first conductive contact 41 of one mobile terminal 20 and a second conductive contact 42 of the other mobile terminal move toward each other and the first conductive contact 41 and the second conductive contact 42 abut finally, the first conductive contact 41 made of the bow-shaped metal sheets will be deformed in a direction perpendicular to a first side surface SL where it is located, so that the second side surface SR and the first side surface SL are bonded in alignment with each other in FIG. 6. In FIG. 6, a first conductive contact 41 in a solid-line part represents the first conductive contact 41 before deformation, and a first conductive contact 41 in a dotted-line part represents the deformed first conductive contact 41.

Figure 7:
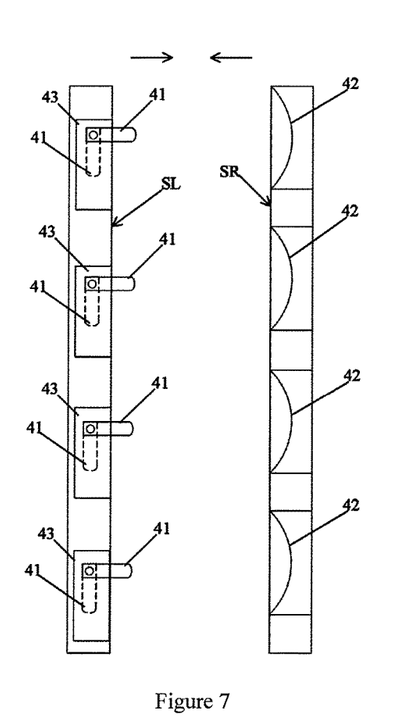
FIG. 7 is a schematic diagram of a first conductive contact and a second conductive contact in another embodiment of the present invention.

As shown in FIG. 7, the present invention further provides another design scheme for a first conductive contact and a second conductive contact: in FIG. 7, a first side surface SL is provided with a first groove 43, and a first conductive contact 41 is rotatably connected into the first groove 43, for example being rotatably connected to two wall faces of the first groove 43 via a rotation shaft. As shown in a solid-line part in FIG. 7, the first conductive contact 41 can rotate out of the first groove 43 so as to make contact with a second conductive contact 42 of the other mobile terminal, and the second conductive contact 42 is of a structure composed of metal leaf springs. As shown in a dotted-line part in FIG. 7, the first conductive contact 41 can rotate inwardly to the first groove 43 so as to disconnect the contact with the second conductive contact 42 of the other mobile terminal.

It can be seen that in the above-mentioned two designs of the first conductive contact 41 and the second conductive contact 42, the first conductive contact 41 is formed as an active contact which can move between an extended position and a retracted position, wherein the active contact protrudes out of the side surface where it is located when in the extended position. In other embodiments, a second conductive contact 42 can also be arranged as an active contact, and the second conductive contact 42 as in FIGS. 6 and 7 can be arranged as an inwardly recessed bow-shaped metal sheet. When the first conductive contact 41 and the second conductive contact 42 are both active contacts, an anti-damage performance of the two can be further increased.

In the above-mentioned two designs of the first conductive contact 41 and the second conductive contact 42, a side surface where the active contact is located is provided with a recessed portion, namely the first groove 43, for accommodating the active contact. In other embodiments, when the first conductive contact 41 or the second conductive contact 42 which is the active contact extends and retracts by means of manual toggling with respect to a side surface where it is located, the recessed portion is in a through hole shape at this time, and the first conductive contact 41 or the second conductive contact 42 extends or retracts via the recessed portion of the through hole shape. A contact cover is further arranged on the recessed portion, the contact cover is detachably connected to the recessed portion for sealing the recessed portion, and when the contact cover seals the recessed portion, the contact cover is flush with a side surface where it is located, such that the design of the contact cover can serve a dust-proof function for components inside the recessed portion, and the hand feeling of using the mobile terminal 20 can also not be affected since the contact cover can be flush with the side surface where it is located.

As stated above, a first side surface SL or a second side surface SR is used for splicing and fitting, so that keys of a mobile phone are not arranged on the first side surface SL or the second side surface SR as far as possible. However, if four side faces of the mobile terminal 20 are all spliced with other mobile terminals 20, a second groove can be arranged on the first side surface SL or the second side surface SR, a manual operation key is arranged in the second groove, and the profile of the manual operation key is not beyond of a side surface where it is located. Of course, in one embodiment, the second groove can be the same as the first groove.

Figure 8:
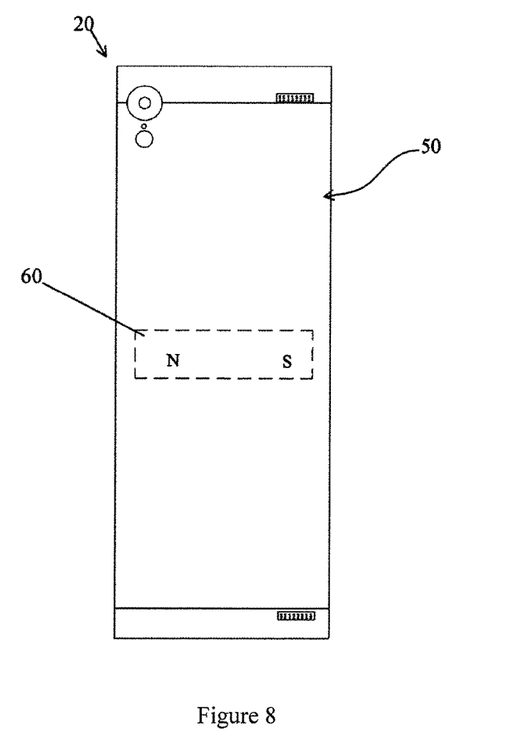
FIG. 8 is a structural schematic diagram of a mobile terminal provided with left and right magnetic adsorbing elements according to one embodiment of the present invention.
Figure 9:
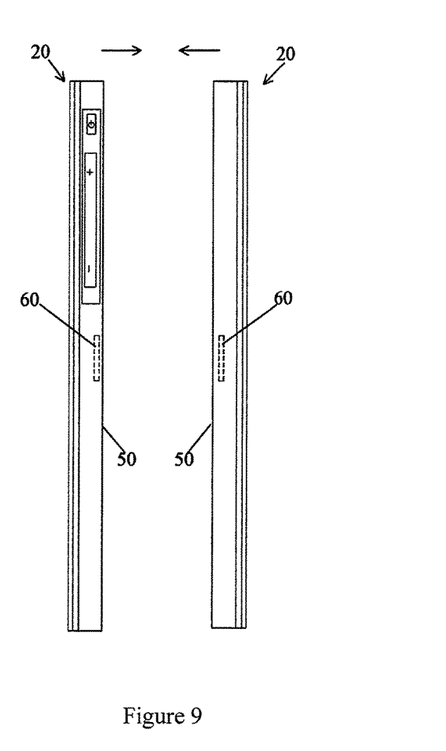
FIG. 9 is a schematic diagram of moving two mobile terminals provided with left and right magnetic adsorbing elements towards a back-to-back direction according to one embodiment of the present invention.
Figure 10:
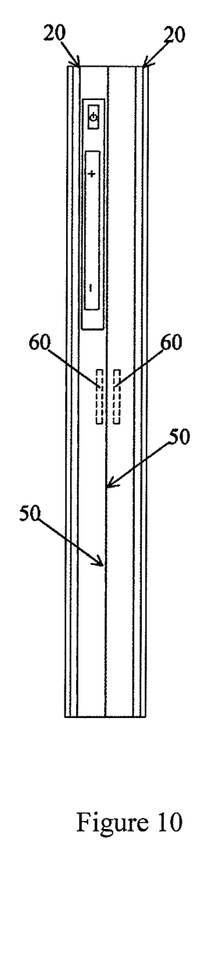
FIG. 10 is a structural schematic diagram of the two mobile terminals in FIG. 9 after being in a back-to-back state.

FIG. 8 is a structural schematic diagram of a mobile terminal provided with left and right magnetic adsorbing elements according to one embodiment of the present invention, particularly a schematic diagram of a back face. In FIG. 8, a left magnetic adsorbing element and a right magnetic adsorbing element disposed along a width direction of a display screen are arranged at a side of a back face 50 of a mobile terminal 20, and the left and right magnetic adsorbing elements in FIG. 8 are a magnet 60. In other embodiments, the left and right magnetic adsorbing elements can also be different components, for example, the left magnetic adsorbing element is a magnet, while the right magnetic adsorbing element is an iron element. In this way, with reference to FIGS. 9 and 10, when the other mobile terminal abuts the current mobile terminal 20 back to back, an N pole and an S pole of the magnet 60 of the mobile terminal and an S pole and an N pole of the magnet of the other mobile terminal can respectively attract each other, so that the back faces of the two mobile terminals have a tendency to be aligned and bonded to each other. In this way, different mobile terminals can be spliced into a combined terminal device 30 in a direction where a display screen 10 is located, while when the combined terminal device 30 is disassembled into a plurality of mobile terminals, the mobile terminals can be attracted together in pair via the magnet, which not only facilitates carrying the mobile terminal, but also reduces the risk of losing the mobile terminal.

Figure 4:
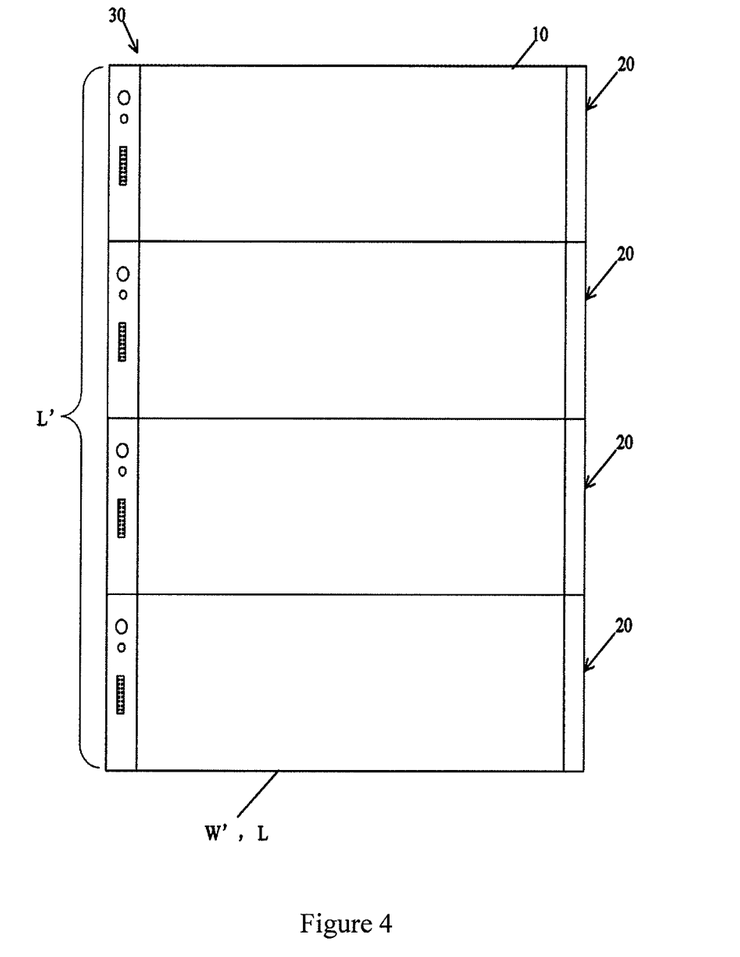
FIG. 4 is a schematic diagram of a combined terminal device according to another embodiment of the present invention, wherein the number of mobile terminals is four.
Figure 5:
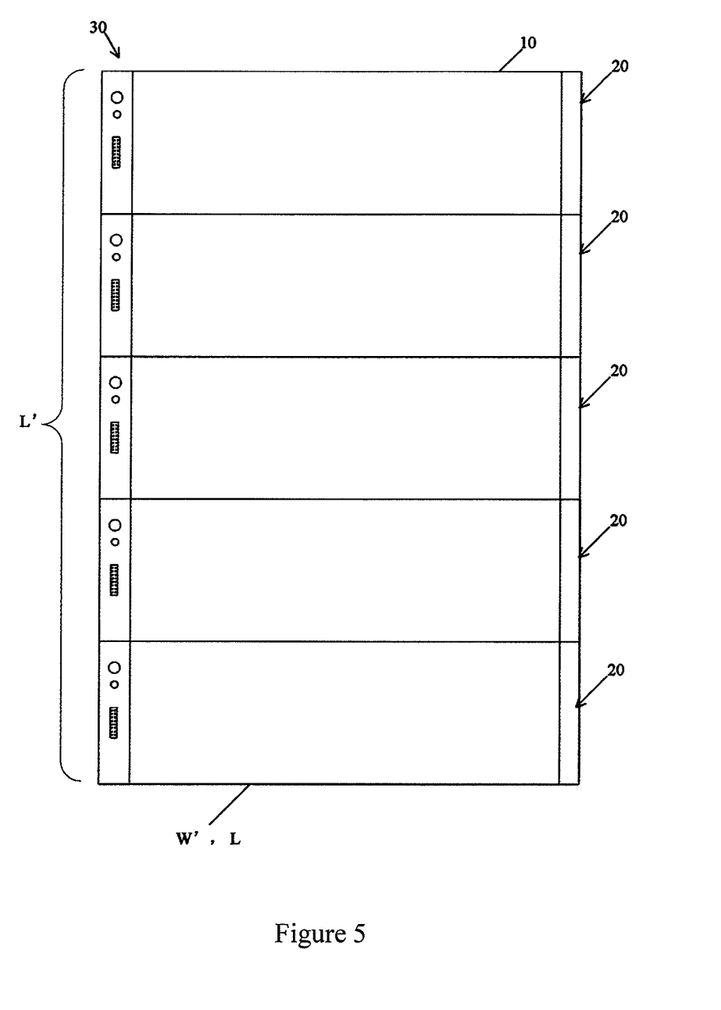
FIG. 5 is a schematic diagram of a combined terminal device according to one embodiment of the present invention, wherein the number of mobile terminals is five.

FIG. 4 is a schematic diagram of a combined terminal device according to one embodiment of the present invention, wherein a combined terminal device 30 in FIG. 4 is formed by splicing four mobile terminals 20, and two long sides of the mobile terminal 20 in FIG. 4 are of a frameless design. As shown in FIG. 5, a combined terminal device 30 provided in the present invention is formed by splicing five mobile terminals 20 along a width direction of a display screen 10, and various mobile terminals 20 are all aligned during splicing, so that a length L of the display screen 10 acts as a width W' of the combined terminal device. In FIG. 5, the mobile terminal 20 is a mobile phone, and in other embodiments, the mobile terminal 20 can also be a tablet computer. In FIGS. 4 and 5, the lengths L' and the widths W' of the combined terminal devices are both 297 mm and 210 mm. That is to say, the width W of the mobile terminal 20 in FIG. 4 is 59.4 mm, and the length L is 210 mm, L:W=3.5; and the width W of the mobile terminal 20 in FIG. 5 is 74.25 mm, and the length L is 210 mm, L:W=2.8. A publication document is displayed by the combined terminal device in FIGS. 4 and 5, so that displaying cannot only be performed without a black boarder in full screen, but also the font size is completely identical to the font size of the paper publication at this time.

The above-mentioned combined terminal device in FIGS. 4 and 5 can also use mobile terminals with a narrow frame and be formed by means of splicing along a width direction of a display screen 10, for example, being able to define or limit the frame to be the narrow frame if the width of the frame is less than 1 mm here, and of course, the width of the frame can also be defined according to requirements. According to the concept of the present invention, the mobile terminal 20, shown in FIGS. 4 and 5, designed to be frameless at two sides in the width direction of the display screen 10 is preferentially used, so that splicing positions of various mobile terminals 20 substantially have no influence on reading at this time, but will gradually produce adverse effects on reading as the widths of the two sides in the width direction of the display screen 10 increase.

Returning to FIG. 1, the mobile terminal 20 shown in FIG. 1 has the display screen 10, and in the width direction of the display screen 10, the two sides of the mobile terminal 20 arranged opposite to each other are arranged in a frameless form. In FIG. 1, a direction x is the length direction of the display screen, and a direction y is the width direction of the display screen. It can be seen from FIGS. 1-5 that the display screen 10 is substantially rectangular. The display screen 10 can be set to L:W≤2.5, where L is the length of the display screen, and W is the width of the display screen. Therefore, in some embodiments of the present invention, the width direction of the display screen is elongated in shape. Thus, with the same width, the display screen 10 has a larger display area. Or in other words, with the same display area, such a display screen 10 can have a relatively small width, thereby facilitating a single hand operation of people. Moreover, it is easier to realize a corresponding A4 paper ratio in a manner of splicing a plurality of display screens in a single row while such a display screen facilitates a single hand operation of a mobile phone user.

According to one embodiment of the present invention, a length-width ratio of the rectangular display screen can be limited to:

$$L:W=(205\text{-}215):[(290\text{-}304)/n], \quad (1)$$

wherein is a positive integer and n≤2. By means of this arrangement, when n mobile terminals 20 are spliced into a combined terminal device 30, a length-width ratio of the combined terminal device 30 is (290-304)/(205-215), that is to say, a length-width ratio of a display area of the combined terminal device 30 spliced by mobile terminals 20 is substantially equal to 297:210, such that the display screen 10 can display a publication document without a black boarder in full screen regardless of the font size.

In one preferred embodiment of the present invention, n is set to be less than or equal to 6. Moreover, when the value of n is 4 or 5, the display screen 10 cannot only have a larger display area, but also the use of the mobile terminal 20 cannot be affected due to the too elongated display screen 10. In one preferred embodiment of the present invention, W is 58-61 mm, and L is 205-215 mm, and especially when W is 60 mm and L is 210 mm, five mobile terminals 20 can form a combined terminal device 30 with a length-width ratio being substantially 297:210. When W is 72-76 mm, and L is 205-215 mm, and especially when W is 74 mm and L is 210 mm, four mobile terminals 20 can form a combined terminal device 30 with a length-width ratio being substantially 297:210. According to the display screen 10 and the mobile terminal 20 of the present invention, there is a larger display area, while it is particularly suitable for a single hand operation. In addition, with regard to the combined terminal device 30 formed by splicing a plurality of mobile terminals 20, a length-width ratio thereof is substantially equal to 297:210, such that a publication document can be displayed without a black boarder in full screen.

It should be understood that a limiting condition for the length-width ratio of the display screen of the mobile terminal described with formula (1) above cannot be limited to a relatively elongated display screen (for example, a display screen with a length-width ratio being not less than 2.5), but can serve as an independent limiting condition. For example, for formula (1), the value of n therein can be 2 or 3. At this time, the length-width ratio is approximately 1.41 and 2.12. Although a single display screen at this time seems not so elongated, it is still favourable to splice the single display screens into a display screen of an A4 paper ratio. Particularly, when two or three such display screens are used to be spliced into a display screen with a size being substantially identical to an actual size of an A4 paper, a length L of the display screen can be 205-215 mm.

Further, it should be understood that in order to purely facilitate splicing into the display screen with the size being substantially identical to the actual size of the A4 paper, the display screen of a mobile terminal can be a rectangular, and the length or width thereof is 205-215 mm. When a plurality of mobile terminals are spliced, in a single row, into a combined terminal device 30, the lengths or widths of these mobile terminals have the same size and the values thereof are between 205-215 mm. Thus, after these mobile terminals are aligned and spliced along the length or width of the same size, the formed single rectangular screen then has a width of 205-215 mm as a whole. The length of the spliced single rectangular screen then can be 290-304 mm, which can be realized by selecting the number of mobile terminals which participate in splicing, or can be realized by selecting the length at a side of the other different size of the mobile terminal. Typically, the combined terminal device 30 can be formed by a combination of one mobile phone and one tablet computer, or can be formed by a combination of one mobile phone and two tablet computers.

The inventor has noticed that, when a combined terminal device 30 shown in one of FIG. 2 to FIG. 5 is spliced by a plurality of mobile terminals 20, as described above, when only used for display or when the operational capability of a CPU is already enough, what do not need to be spliced are all mobile terminals 20 with a operational capability; that is to say, now a mobile terminal 20 in the combined terminal device 30 shown in FIG. 2 to FIG. 5 can be replaced with a mobile power bank 70 with a display screen provided in the present invention. The mobile power bank 70 has only the functions of receiving external power to charge for a storage battery 73, supplying power for the display screen 71 and an external device such as a mobile terminal 20, and receiving display data from the external device such as a mobile terminal 20 for displaying at a display screen 71, but does not have other phone functions such as operation. The mobile terminal 20 provides the mobile power bank 70 with display data of a display screen 71 thereof, and the storage battery 73 of the mobile power bank 70 provides power for the mobile terminal 20.

As an illustrative example, the mobile power bank 70 with a display screen shown in FIG. 11 and FIG. 13 comprises a display screen 71, a storage battery 73 located below the display screen 71, and a casing (not shown in the figures) for holding the display screen 71 and the storage battery 73. The mobile power bank 70 is generally flat-plate shaped with a front surface 74 and a back surface 75; and in the splicing direction, the display screen 71 of the mobile power bank 70 has the same width or length as the display screen 10 of the mobile terminal 20. Generally, the display screen 71 of the mobile power bank 70 is located at the front surface 74; in FIG. 11, the display screen 71 completely provides the front surface 74; however, in the embodiment shown in FIG. 13, the display screen 71 only provides a part of the front surface 74, but both an area of a display region of the display screen 71 and an area of an occupied region of the storage battery 73 are not less than 70% of the area of the front surface 74. For example, the area of the display region of the display screen 71 is not less than 75%, 80%, 85%, 90% or 95% of the area of the front surface 74. In an illustrative embodiment of the present invention, the area of the display region of the display screen 71 is 76%, 77%, 78%, 79%, 80%, 81%, 82%, 83%, 84%, 85%, 86%, 87%, 88%, 89%, 90%, 91%, 92%, 93%, 94%, 95%, 96%, 97% or 98% of the area of the front surface 74. In one embodiment of the present invention, the area of the occupied region of the storage battery 73 is not less than 75%, 80%, 85%, 90% or 95% of the area of the front surface 74. In an illustrative embodiment of the present invention, the area of the occupied region of the storage battery 73 is 76%, 77%, 78%, 79%, 80%, 81%, 82%, 83%, 84%, 85%, 86%, 87%, 88%, 89%, 90%, 91%, 92%, 93%, 94%, 95%, 96%, 97% or 98% of the area of the front surface 74. By means of this arrangement, a volume of the storage battery 73 can be increased without changing the thickness of the storage battery 73, providing an extended charging service for mobile terminals 20. In addition, when the mobile power bank 70 is connected to a mobile terminal 20, such as a mobile phone, the display screen 71 of the mobile power bank 70 and a display screen 10 of the mobile terminal 20 may perform display at the same time.

In one embodiment of the present mobile power bank 70, when the mobile power bank 70 and the mobile terminal 20 are spiced, on one hand, charging is supplied for the mobile terminal 20, and one the other hand, the display screen 71 of the mobile power bank 70 and the display screen 10 of the mobile terminal 20 form an A4 paper ratio together to display contents.

Figure 11:
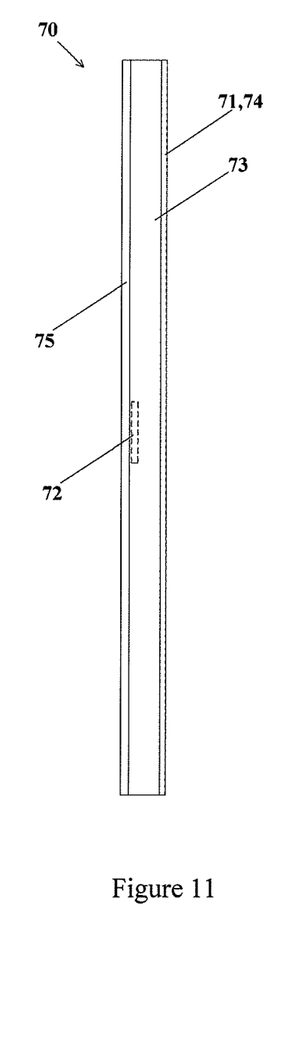
FIG. 11 is a structural schematic diagram of a mobile power bank according to one embodiment of the present invention.
Figure 13:
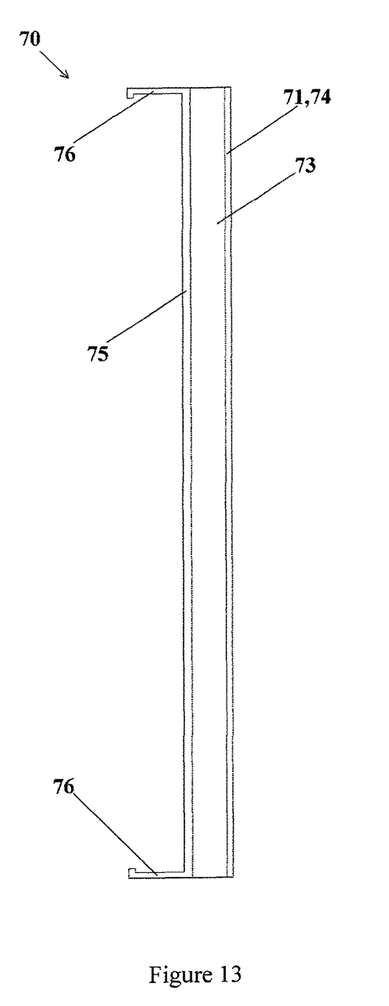
FIG. 13 is a structural schematic diagram of a mobile power bank according to another embodiment of the present invention.

In the embodiments of the invention shown in FIG. 11 and FIG. 13, the mobile power bank 70 is generally substantially rectangular flat-plate shaped, in order to be spliced with the substantially rectangular mobile terminal 20 shown in FIG. 1. Of course, the shape of the mobile power bank 70 can also be specifically designed according to the requirement for splicing with the mobile terminal 20.

Figure 12:
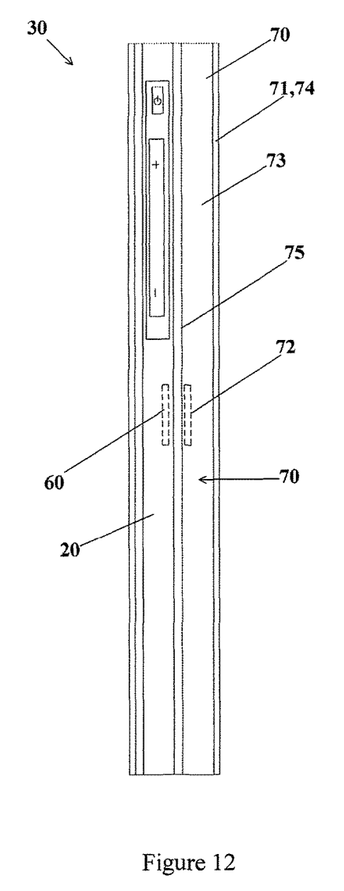
FIG. 12 is a structural schematic diagram of the mobile power bank and the mobile terminal in FIG. 11 after being in a back-to-back state.
Figure 14:
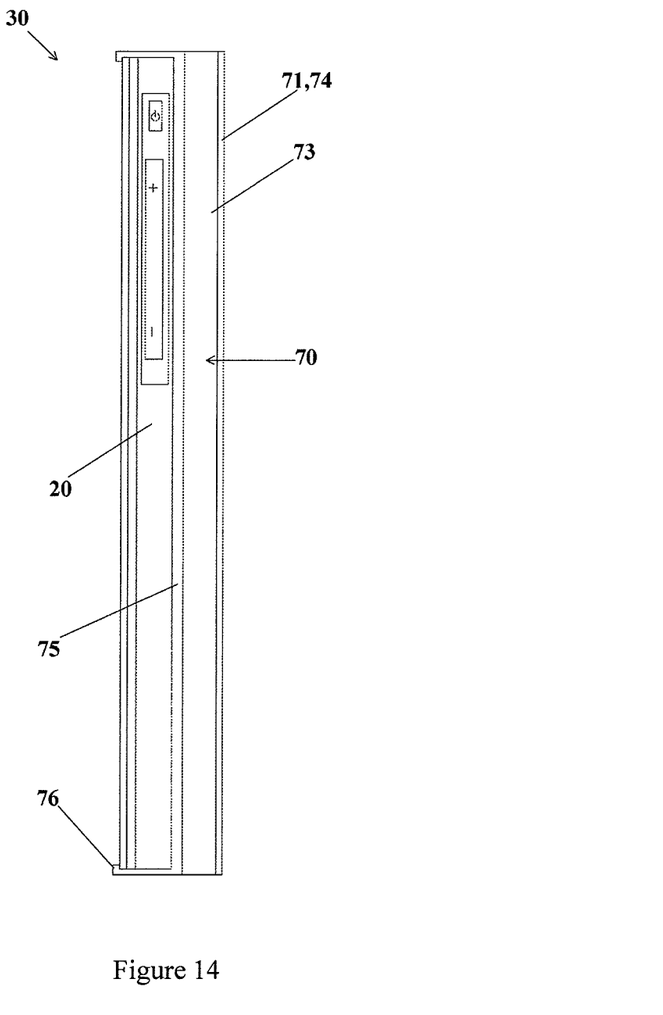
FIG. 14 is a structural schematic diagram of the mobile power bank and the mobile terminal in FIG. 13 after being in a back-to-back state.

The mobile power bank 70 of the present invention has a holding structure, provided on the casing, for holding the mobile terminal 20 at the back surface 75. In the embodiment as shown in FIG. 11, the holding structure has a back-side magnetic adsorbing element 72 arranged adjacent to the back surface 75, and the back-side magnetic adsorbing element 72 is used for adsorbing a corresponding back-side magnetic adsorbing element provided on the mobile 20 (e.g. the magnet 60 shown in FIG. 8 and FIG. 9), so as to hold the mobile terminal 20 at the back surface 75 of the mobile power bank 70 as shown in FIG. 12. In the embodiment shown in FIG. 13, the holding structure comprises a clip 76 for clamping the mobile terminal 20, and the provision of the clip 76 enables the mobile power bank 70 to be substantially in the form of a mobile phone shell in general. As shown in FIG. 14, when the mobile power bank 70 shown in FIG. 13 and the mobile terminal 20 are combined into a combined terminal device 30, the clip 76 clamps the mobile terminal 20. At this time, the back surface 75 of the mobile power bank 70 lies against the back surface of the mobile terminal 20, and the display screen of the front surface of the mobile power bank 70 and of the mobile terminal 20 both face outwards. When the mobile power bank 70 is in a data connection with the mobile terminal 20, double-screen display can be realized at the display screen of the front surface of the mobile power bank 70 and the mobile terminal 20.

As described above, since one mobile terminal 20 in the combined terminal device 30 shown in FIG. 2 to FIG. 5 can be replaced with the mobile power bank 70 of the present invention, the mobile power bank 70 can be arranged to located a first side surface and a second side surface, which are parallel to each other, at two sides of the mobile power bank 70 like the mobile terminal 20. The mobile power bank 70 can also be provided with a first magnetic adsorbing element provided at the first side surface and a second magnetic adsorbing element provided at the second side surface, for adsorbing a corresponding side magnetic adsorbing element arranged at a side surface of a mobile terminal 20, so that any side of the mobile power bank 70 can hold the mobile terminal 20 by adsorption. The arrangement of the first side surface and the second side surface, and of the first magnetic adsorption element and the second magnetic adsorption element is substantially the same as that of the first and second side surface (SL and SR) and of the first magnetic adsorption element and the second magnetic adsorption element of the mobile terminal 20 described above, for example, the first magnetic adsorbing element does not protrude out of the first side surface, and the second magnetic adsorbing element does not protrude out of the second side surface; the detailed arrangement will not be described herein any more.

In one embodiment of the mobile power bank 70 of the present invention, a first conductive contact is arranged at the first side surface, and a second conductive contact is arranged at the second side surface. The first conductive contact and the second conductive contact are used for mutually electrically contacting with a conductive contact correspondingly provided at the side surface of the mobile terminal 20 held by the mobile power bank 70, so as to provide data transmission from the mobile terminal 20 to the mobile power bank 70 and discharge from the mobile power bank 70 to the mobile terminal 20. In a preferred embodiment, at least one of the first conductive contact and the second conductive contact of the mobile power bank 70 is made of an elastic material or biased by a spring so as to be able to move in a direction perpendicular to the side surface where it is located. For example, the first conductive contact is composed of a plurality of bow-shaped metal sheets, and the second conductive contact is recessed into said second side surface; and when the first conductive contact and the second conductive contact are in mutual electrical contact with a conductive contact correspondingly provided at the side surface of the mobile terminal 20 held by the mobile power bank 70, the second side surface of the mobile terminal 20 and the first side surface of the mobile. terminal 20 are bonded in alignment with each other by deforming the first conductive contact in the direction perpendicular to the side surface where it is located. At least one of the first conductive contact and the second conductive contact is formed as an active contact which can move between an extended position and a retracted position: the active contact protrudes out of the side surface where it is located when in the extended position, wherein a side surface where the active contact is located is provided with a recessed portion for accommodating the active contact and a detachable contact cover for sealing the recessed portion. For example, the first side surface has a first groove, and the first conductive contact is rotatably connected into the first groove; and the first conductive contact can rotate out of the first groove so as to make mutual electrical contact with a conductive contact correspondingly provided at the side surface of the mobile terminal 20, and the first conductive contact can rotate inwardly to the first groove so as to disconnect the electrical contact with the conductive contact correspondingly provided at the side surface of the mobile terminal 20.

Up to this, a person skilled in the art should recognize that although a plurality of exemplary embodiments of the present invention have been shown and described in detail herein, numerous other variations or modifications meeting the principle of the present invention can be directly determined or derived according to the contents disclosed in the present invention. Therefore, the scope of the present invention should be construed and considered as covering all of such other variations or modifications.

The invention claimed is:

1. A mobile power bank with a display screen, characterized by comprising:
    a display screen;
    a storage battery located below said display screen; and
    a casing for holding said display screen and said storage battery,
    wherein said mobile power bank is generally flat-plate shaped with a front surface and a back surface; said display screen is located on said front surface and provides at least a part of said front surface; and both an area of a display region of said display screen and an area of an occupied region of said storage battery are not less than 70% of the area of said front surface;
    said casing has a holding structure for holding a mobile terminal at said back surface; and
    said holding structure comprises a rear magnetic adsorbing element arranged adjacent to said back surface, for adsorbing a corresponding rear magnetic adsorbing element arranged on said mobile terminal, so as to hold said mobile terminal at said back surface.

2. The mobile power bank according to claim 1, characterized in that said mobile power bank is generally substantially rectangular flat-plate shaped.

3. The mobile power bank according to claim 1, characterized in that the area of the display region of said display screen is not less than 75%, 80%, 85%, 90% or 95% of the area of the front surface, and/or the area of the occupied region of said storage battery is not less than 75%, 80%, 85%, 90% or 95% of the area of the front surface.

4. The mobile power bank according to claim 1, characterized in that said mobile power bank has the functions of receiving external power to charge said storage battery, supplying power for said display screen and an external device, and receiving display data from said external device for displaying on the display screen.

5. The mobile power bank according to claim 4, characterized in that said external device is a mobile terminal.

6. The mobile power bank according to claim 1, characterized by further comprising:
   a first side surface and a second side surface located at two sides of said mobile power bank, wherein said first and second side surfaces are planes parallel to each other; and
   a first magnetic adsorbing element provided at said first side surface and a second magnetic adsorbing element provided at said second side surface, for adsorbing a corresponding side magnetic adsorbing element arranged at a side surface of a mobile terminal, so that any side of said mobile power bank can hold said mobile terminal by adsorption.

7. The mobile power bank according to claim 6, wherein said first magnetic adsorbing element does not protrude out of said first side surface, and said second magnetic adsorbing element does not protrude out of said second side surface.

8. The mobile power bank according to claim 6, characterized by further comprising:
   a first conductive contact provided at said first side surface and a second conductive contact provided at said second side surface, for mutually electrically contacting with a conductive contact correspondingly provided at the side surface of said mobile terminal held by said mobile power bank, so as to provide data transmission from said mobile terminal to said mobile power bank and discharge from said mobile power bank to said mobile terminal.

9. The mobile power bank according to claim 8, characterized in that at least one of said first conductive contact and said second conductive contact is made of an elastic material or biased by a spring so as to be able to move in a direction perpendicular to the side surface where it is located.

10. The mobile power bank according to claim 9, characterized in that said first conductive contact is composed of a plurality of bow-shaped metal sheets, and said second conductive contact is recessed into second side surface; and when said first conductive contact and said second conductive contact are in mutual electrical contact with a conductive contact correspondingly provided at the side surface of said mobile terminal held by said mobile power bank, said second side surface of said mobile terminals and said side surface of said mobile terminals are bonded in alignment with each other by deforming said first conductive contact in the direction perpendicular to the side surface where it is located.

11. The mobile power bank according to claim 8, characterized in that at least one of said first conductive contact and said second conductive contact is formed as an active contact which can move between an extended position and a retracted position, wherein the active contact protrudes out of the side surface where it is located when in the extended position.

12. The mobile power bank according to claim 11, wherein the side surface where said active contact is located is provided with:
   a recessed portion for accommodating said active contact, and
   a detachable contact cover for sealing said recessed portion.

13. The mobile power bank according to claim 11, characterized in that said first side surface has a first groove, and the first conductive contact is rotatably connected into the first groove; and said first conductive contact can rotate out of said first groove so as to make mutual electrical contact with a conductive contact correspondingly provided at the side surface of said mobile terminal, and said first conductive contact can rotate inwardly to said first groove so as to disconnect the electrical contact with the conductive contact correspondingly provided at the side surface of said mobile terminal.

14. A combined terminal device composed by splicing one or more mobile terminals and at least one mobile power bank as claimed in claim 1 in the width direction and/or length direction of said display screen of said mobile power bank, wherein said mobile terminal provides said mobile power bank with display data of a display screen thereof, and said storage battery of said mobile power bank supplies power for said mobile terminal.

15. The combined terminal device according to claim 14, characterized in that, in the splicing direction, said display screen of said mobile power bank has the same width or length as a display screen of said mobile terminal.

* * * * *